United States Patent [19]

Takizawa et al.

[11] Patent Number: 4,696,483
[45] Date of Patent: Sep. 29, 1987

[54] VEHICLE SUSPENSION APPARATUS

[75] Inventors: Shozo Takizawa; Minoru Tatemoto, both of Okazaki; Akio Furumura, Toyota; Tadashi Sugawara, Okazaki; Shigeo Kariya, Nagoya; Kazuo Hiroshima, Okazaki, all of Japan

[73] Assignee: Mitsubishi Jidosha Kogyo K.K., Tokyo, Japan

[21] Appl. No.: 747,107

[22] Filed: Jun. 20, 1985

[30] Foreign Application Priority Data

Jun. 26, 1984 [JP] Japan .................. 59-94569[U]

[51] Int. Cl.[4] .................................. B60G 17/00
[52] U.S. Cl. .................................. 280/6 H; 280/707; 280/DIG. 1
[58] Field of Search .............. 280/6 R, 6 H, 6.1, 707, 280/DIG. 1

[56] References Cited

U.S. PATENT DOCUMENTS

| 3,917,309 | 11/1975 | Hegel et al. | 267/65 D |
|---|---|---|---|
| 4,216,977 | 8/1980 | Fujii | 280/707 |
| 4,270,771 | 6/1981 | Fujii | 280/707 |
| 4,335,901 | 6/1982 | Gladish | 280/6 R |
| 4,364,574 | 12/1982 | Saito | 280/707 |
| 4,453,725 | 6/1984 | Kuwana et al. | 280/6 R |

FOREIGN PATENT DOCUMENTS 2162558 7/1973 France .
2407834 11/1977 France .
53-326021 3/1978 Japan .

Primary Examiner—John J. Love
Assistant Examiner—Ross Weaver
Attorney, Agent, or Firm—Frishauf, Holtz, Goodman & Woodward

[57] ABSTRACT

A vehicle suspension apparatus has suspension units each with a height control fluid spring chamber, fluid supply valves for supplying a fluid from a fluid source to the spring chambers through corresponding supply control valve means, and fluid exhaust valve means for exhausting the fluid from the fluid spring chambers through exhaust control valve means. The supply control valve means are opened only for a predetermined period of time to increase the height by a predetermined distance upon the operation of a high height selection switch, thereby increasing the height to the maximum height.

24 Claims, 4 Drawing Figures

VEHICLE SUSPENSION APPARATUS

BACKGROUND OF THE INVENTION

The present invention relates to a vehicle suspension apparatus with a hydraulic height control function.

A known conventional vehicle suspension apparatus comprises height control fluid spring chambers arranged between the respective wheels and the vehicle body, a fluid supply means for supplying a fluid from a fluid source to the fluid spring chambers through corresponding fluid supply control valves, a fluid exhaust means for exhausting the fluid from the fluid spring chambers through corresponding fluid exhaust control valves, a height sensor for detecting the vehicle's height from the ground (hereinafter referred to as the vehicle's height), and a height control means for comparing the height detected by the height sensor with a target height and controlling the supply or exhaust control valves so as to make the detected height equal to the target height.

In a conventional vehicle suspension apparatus of this type, in the case of increasing the vehicle height so as to decrease the virtual distance to jack-up the vehicle upon replacement of wheels or to simplify attachment-/detachment of tire chains, the height control means sets the target height to a high height which is higher than the normal height, and controls said valves so as to make the detected height equal to the target height.

According to the height control technique described above, however, the following drawback is presented. When the height is to be increased, the height detected by the height sensor must be discriminated as higher or lower than the target height, thereby complicating the structure of the height sensor. For example, in order to set the height to a height higher than the high vehicle's height, the target height is set at an extra high height. At the same time, the height sensor must have a function for discriminating whether or not the detected height is higher than the extra high height. As a result, the structure of the height sensor is more complicated, thus resulting in inconvenience.

SUMMARY OF THE INVENTION

It is an object of the present invention to provide a vehicle suspension apparatus free from the conventional drawbacks.

In order to achieve the above object of the present invention, there is provided a vehicle suspension apparatus comprising height control fluid spring chambers arranged between the respective wheels and the vehicle body, fluid supply means for supplying a fluid from a fluid source to the fluid spring chambers through corresponding fluid supply control valves, fluid exhaust means for exhausting the fluid from the fluid spring chambers through corresponding fluid exhaust control valves, a height sensor for detecting a vehicle's height, and height control means for comparing the height detected by the height sensor with a target height and controlling the supply or exhaust control valves so as to set the detected height to the target height, wherein the apparatus further comprises a high height selection switch and special high height control means for opening the supply control valves for a predetermined period of time so as to increase the detected height by a predetermined value upon operation of the high height selection switch.

DETAILED DESCRIPTION OF THE PREFERRED EMBODIMENT

Figure 1:
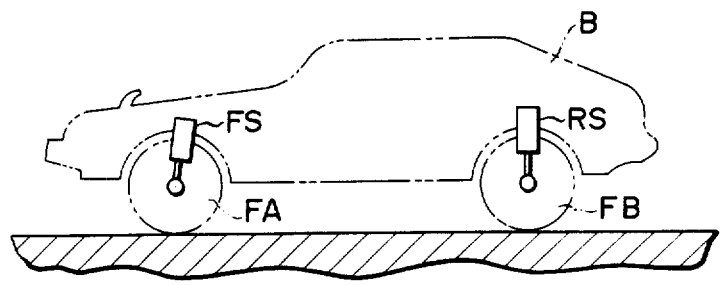
FIG. 1 is a diagram showing a vehicle having a vehicle suspension apparatus according to the present invention.

The present invention will be described in detail with reference to a preferred embodiment in conjunction with the accompanying drawings. FIGS. 1 to 4 show a vehicle suspension apparatus according to the embodiment. In FIG. 1, reference character B denotes a vehicle body; FA, front wheels; and FB, rear wheels. Front suspension units FS (FS1, FS2) are interposed between the body B and the front wheels FA, and rear suspension units RS (RS1, RS2) are interposed between the body B and the rear wheels FB. In FIG. 2, the unit FS1 is a front left wheel suspension unit; FS2, a front right wheel suspension unit; RS1, a rear left wheel suspension unit; and RS2, a rear right wheel suspension unit. The units FS1, FS2, RS1 and RS2 have an identical structure and are exemplified by the suspension unit S except when the units for the front and rear or right and left wheels are described distinctly, and only a necessary portion for controlling the vehicle height will be shown.

Figure 2B:
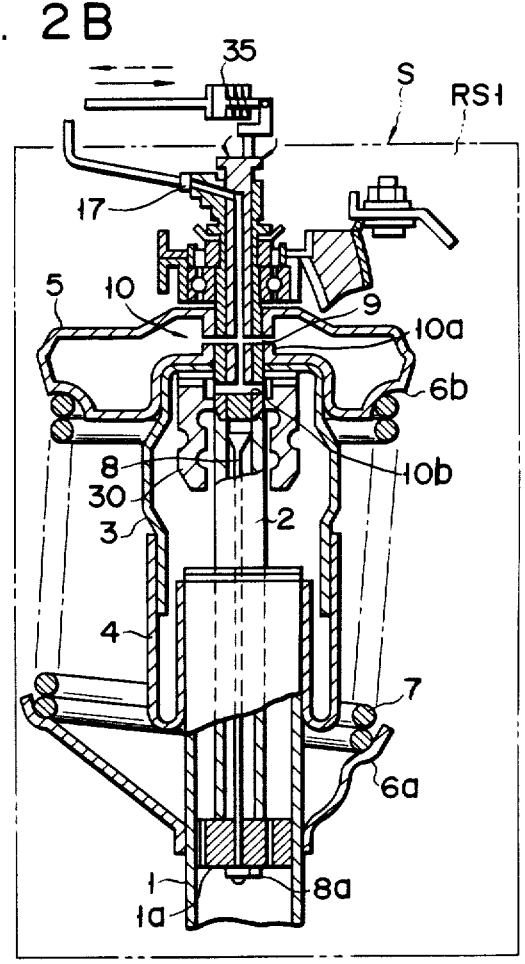
FIG. 2B is a sectional view showing the detailed structure of a rear suspension unit in the vehicle suspension apparatus of FIG. 2A.
Figure 2A:
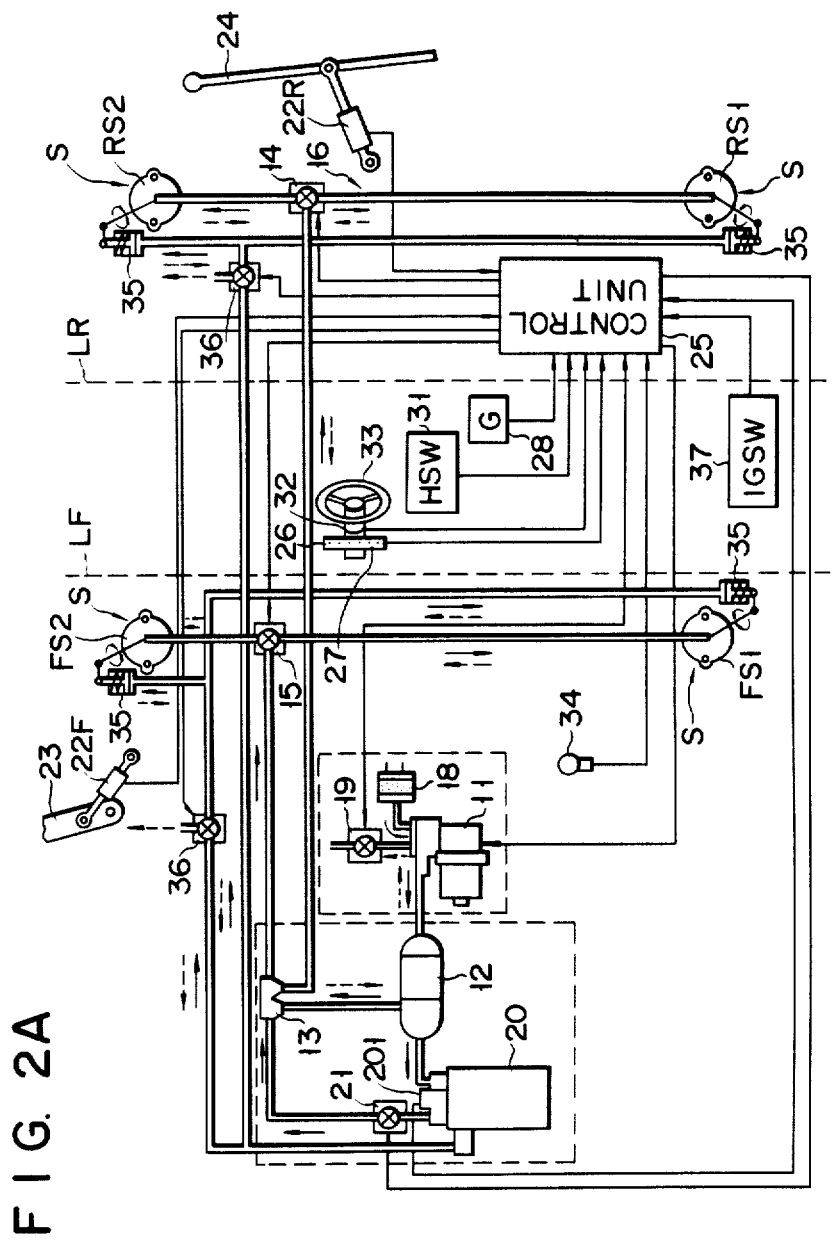
FIG. 2A is a diagram showing the system configuration of the vehicle suspension apparatus according to an embodiment of the present invention.

In FIG. 2B, the suspension unit S comprises a strut type attenuation switching shock absorber 1. The shock absorber 1 has a cylinder mounted at the wheel side, a piston 1a slidably telescoped into the cylinder, and a piston rod 2 supported at its upper end to the body B. The shock absorber provides a damping function in response to the position of a control valve 8a to be described in detail later when the cylinder elevationally moves to the piston rod 2 in response to the elevational movements of the wheels.

The suspension unit S further comprises a main air spring chamber 3 which has a function of controlling a vehicle height coaxially with the piston rod 2 at the top of the shock absorber 1. The main air spring chamber 3 is partly formed of a bellows 4 to raise or lower the vehicle height by supplying or exhausting air to or from the air spring chamber 3. An auxiliary air spring chamber 5 is provided coaxially with the piston rod 2 immediately above the main air spring chamber 3.

A spring retainer 6a directed upward is provided on the outer wall of the cylinder of the shock absorber 1, and a spring retainer 6b directly downward is provided on the outer wall of the auxiliary air spring chamber 5. A coiled spring 7 is contracted between the both spring retainers 6a and 6b. The coiled spring 7 supports part of the weight of the body B.

Both air spring chambers 3 and 5 communicate with each other through a communicating path 9 perforated in the control rod 8 rotatably inserted into the piston rod 2, and an opening and closing valve 10 having spring constant switching function is provided in the path 9. The valve 10 has a first valve portion 10a which controls communication/noncommunication between the chamber 5 and the path 9, and a second valve portion 10b which controls communication/noncommunication between the chamber 3 and the path 9. In the open mode of the valve 10, the chamber 3 and the chamber 5 are communicated with each other, thereby decreasing the spring constant. In the closed mode of the valve 10, the chamber 3 and the chamber 5 are closed, thereby increasing the spring constant. In other words, the volume of the spring chamber can be varied by opening or closing the valve 10 by turning the control rod 8 to change the spring constant of the suspension.

The control valve 8a which can vary the area of an orifice of the piston 1a of the shock absorber 1 is provided at the lower end of the rod 8. The valve 8a increases the area of the orifice of the piston 1a when the valve 10 is in the open mode by the rod 8 to reduce an attenuating force, and decreases the area of the orifice of the piston 1a when the valve 10 is in the closed mode to increase the attenuating force.

A circuit for supplying and exhausting air to and from the air spring chamber 3 of the suspension unit S will now be described in detail. A compressed air for controlling the vehicle height is supplied to the respective suspension units S from a compressor 11 as a compressed air generator through a drier 12, a joint 13, a rear solenoid valve 14 or a front solenoid valve 15, a pipe 16 for connecting them, and a communicating port 17 communicated with the path 9 in the partly pipe like control rod 8 for connecting them.

The compressor 11 compresses atmospheric air intaked from an air cleaner 18 and supplies the compressed air to the drier 12. The compressed air dried by silica gel of the drier 12 is supplied to the respective suspension units S as denoted by arrows with solid lines of FIGS. 2A and 2B. When the compressed air is exhausted from the respective suspension units S, the compressed air is exhausted into the atmospheric air through an exhaust solenoid valve 19 as denoted by arrows with broken lines of FIGS. 2A and 2B.

A reserve tank 20 is connected to the drier 12, and a part of the compressed air is supplied from the tank 20 through an air supply solenoid valve 21 to the respective suspension units S. When the internal pressure of the tank 20 is decreased below a predetermined value, a pressure sensor 201 supplies a signal to the unit 25, and the unit 25 supplies a control signal to the compressor 11 which is then driven.

Reference numeral 22F denotes a front vehicle height sensor for detecting the front vehicle height of a vehicle mounted on a lower arm 23 of the front right suspension of the vehicle; and 22R, a rear vehicle height sensor for detecting the rear vehicle height of the vehicle mounted on a lateral rod 23 of the rear left suspension of the vehicle. A front vehicle height detection signal and a rear vehicle height detection signal from the sensors 22F and 22R are supplied to a control unit 25 having a microcomputer as a vehicle height controller.

Each of these sensors 22F and 22R comprises a Hall IC element and a magnet, one of which is mounted on the wheel side and the other of which is mounted on the body side so as to detect the distance between the current level and a normal, high or low vehicle height level. More particularly, the sensors output a vehicle height detection signal N in case of the normal vehicle height, L in case of the low vehicle height level, H in case of the high vehicle height level, LL in case that lower than the low vehicle height level, NL in case that between the low vehicle height level and the normal vehicle height level, NH in case that between the normal vehicle height level and the high vehicle height level, and HH in case higher than the high vehicle height level. The both vehicle height sensors may be of other type such as, for example, that employing a phototransistor.

Reference numeral 27 denotes a vehicle velocity sensor contained in a speedometer 26. The sensor 27 supplies a detected vehicle speed signal to a control unit 25. The sensor 27 may use a sensor of a lead switching type in a mechanical speedometer and an open collector outputting type by a transistor in an electronic speedometer.

Reference numeral 28 denotes an acceleration sensor (G sensor) for detecting the acceleration operated on the vehicle body. The sensor 28 serves to detect the forward or backward, leftward or rightward and upward or downward acceleration of the sprung mass of the suspension of the vehicle, i.e., of the vehicle body. When no acceleration acts, a weight is suspended, a light from a light emitting diode is shielded by a shielding plate which cooperates with the weight and does not reach a photodiode to detect no acceleration. When an acceleration higher than the set value acts on the vehicle body, the weight is inclined or moved to cause the acceleration to be operated on the vehicle body, thereby detecting the acceleration. A signal of the sensor 28 is supplied to the control unit 25.

Reference numeral 32 denotes a steering sensor for detecting the rotating velocity of a steering wheel 33, i.e., the steering angular velocity. Reference numeral 34 denotes an accelerator sensor for detecting the depressing velocity of an accelerator pedal of an engine (not shown). The detection signals of the sensors 32 and 34 are supplied to the control unit 25.

Reference numeral 35 denotes a pneumatic drive mechanism provided at each suspension unit S for rotating the control rod 8 through the communication of a 3-way directional valve 36. The valve 36 can select any of a first position for communicating between the pneumatic drive mechanism 35 and the atmosphere and a second position for communicating between the pneumatic drive mechanism 35 and the reserve tank 20 by a control signal from the control unit 25, thereby allowing the drive mechanism 35 to control the rotation of the control rod 8. The drive mechanism 35 holds the control rod 8 at a soft position for holding the spring constant and the attenuating force of the suspension unit S small when the valve 36 is disposed at the first position and holds the control rod 8 at the hard position for holding the spring constant and the attenuating force of the suspension unit S when the valve 36 is disposed at the second position. The pneumatic drive mechanism 35 is always energized by the spring to the first position.

A solenoid type drive mechanism may be used instead of the pneumatic drive mechanism 35.

Reference numeral LF denotes a boundary between an engine room (left side from a broken line LF of the drawing) and a compartment chamber (between broken lines LF and LR); and LR, a boundary between the compartment chamber and a trunk room (right side from a broken line LR).

Reference numeral 30 denotes a bump stopper for preventing damage of the wall surface of the main air spring chamber 3 when the cylinder of the shock absorber 1 is largely raised on a rough road.

Reference numeral 31 denotes a mode selection switch (HSW) which comprises a normally open switch for selecting a height control mode in the unit 25. This switch 31 serves to select an AUTO mode for automatically controlling the vehicle height in response to the traveling state of the vehicle to any of the normal vehicle height, the low vehicle height and the high vehicle height, and a high mode for controlling the vehicle height to the high vehicle height to be described in detail later.

Reference numeral 37 denotes an ignition switch (IGSW) as an engine switch. An operation signal from the switch 37 is supplied to the unit 25.

The operation of the vehicle suspension apparatus having the arrangement described above will now be described with reference to FIG. 3.

The unit 25 checks in step S1 whether or not the switch 31 is turned on. If YES in step S1, the flow advances to step S2. In step S2, one of the auto height mode or the high height mode is set as the height control mode in the unit 25. More specifically, in step S2, if the auto height mode is already set as the control mode in the control unit 25, the high height mode is set in place of the auto height mode. However, if the high height mode is already set in the unit 25, the auto height mode is set. In other words, every time the switch 31 is operated, the auto and high height modes are alternately set. The flow advances to step S3. The unit 25 checks in step S3 whether or not the current control mode is the high height mode.

If YES in step S3, the flow advances to step S4. The unit 25 checks in step S4 whether or not the switch 31 is depressed for 3 seconds or more. If YES in step S4, the flow advances to step S5. The unit 25 checks in step S5 whether or not 60 seconds have elapsed after height control is started. At this moment, since height control is not started, i.e., since NO in step S5, the flow advances to step S6.

Control for raising the height of the front and rear of the body B is started in step S6. More particularly, the unit 25 generates a control signal to open the valves 14, 15 and 21. Compressed air is supplied from the tank 20 to the chambers 3 and/or 5 of the respective units S, thereby starting the control of the raising of the wheels.

The flow advances to step S7. The unit 25 checks in step S7 whether or not a velocity V detected by the sensor 27 is equal to or lower than 20 km/h. If YES in step S7, the flow advances to step S8 to check whether or not the switch 31 is turned on again. In other words, when the switch 31 is determined in step S1 to be on, the unit 25 checks in step S8 whether or not the switch 31 is turned on again after it is turned off.

If NO in step S8, the flow advances to step S9 to check whether or not the switch 37 is kept off. While the switch 37 is kept off, step S9 is determined to be NO, and the flow returns to step S5. In other words, when the velocity is lower than 20 km/h and the switch 37 is kept on, the operations in steps S5, S6, S7, S8 and S9 are repeated until 60 seconds elapse. The predetermined period of time, i.e., 60 seconds detected in step S5 is properly determined in accordance with the performance of the suspension apparatus. In this embodiment, when compressed air is supplied to the chambers 3 and 5 of the units S for 60 seconds, the height can be increased to the maximum height allowed during parking or low-speed driving.

When 60 seconds have elapsed after height control is started, step S5 is determined to be YES, and the flow advances to step S10. Height control is stopped in step S10. More specifically, in step S10, the unit 25 generates a control signal to close the valves 14, 15 and 21.

The flow then advances to step S11. The unit 25 checks in step S11 whether or not the velocity detected by the sensor 27 is equal to or lower than 20 km/h. If YES in step S11, the flow advances to step S12. The unit 25 checks in step S12 whether or not the switch 31 is turned on again. When the switch 31 is discriminated to be turned on in step S1, the unit 25 checks again in step S12 whether or not the switch 31 is turned on after it is turned off.

If NO in step S12, the flow advances to step S13. The unit 25 checks in step S13 whether or not the switch 37 is kept off. If NO in step S13, the flow returns to step S10. In other words, when the switch 37 is kept on and the velocity is lower than 20 km/h, the operations in steps S10, S11, S12 and S13 are repeated.

However, if NO in step S13, the flow advances to step S14 wherein height control is inhibited. More specifically, in step S14, the unit 25 inhibits the opening of the valves 19 and 21, so that the compressed air will be neither supplied to nor exhausted from the chambers 3 and 5 of the units S. Thereby, when the switch 37 is turned off after the height is increased to the maximum height by height control in step S6, height control is inhibited and the height is kept at the maximum position.

If YES in step S9, i.e., even if the switch 37 is turned off before 60 seconds have elapsed after height up control was started, the flow advances to step S14, so that the height is kept at the height set in step S6.

However, if NO in step S7 or S11, the flow advances to step S15. The target height is set to the high height in accordance with the high height mode.

If NO in step S3 or YES in step S8 or S12, the flow advances to step S16 to set the target height in accordance with the auto height mode.

According to the embodiment described above, the following effects can be obtained.

First, in order to maximize the height so as to substantially decrease the distance needed to jack-up the vehicle upon replacement of wheels or to simplify attachment/detachment of tire chains, the high height mode is selected by the switch 31. In addition, the switch 31 is kept on for 3 seconds or more, so that the unit 25 causes the compressed air to be supplied to the chambers 3 and/or 5 of the respective suspension units S for 60 seconds, thereby obtaining the allowable highest position. The unit 25 need not discriminate whether or not the sensors 22F and 22R discriminate that current front and rear heights are higher than the maximum height. The structure of the sensors 22F and 22R will not therefore be complicated.

Figure 3:
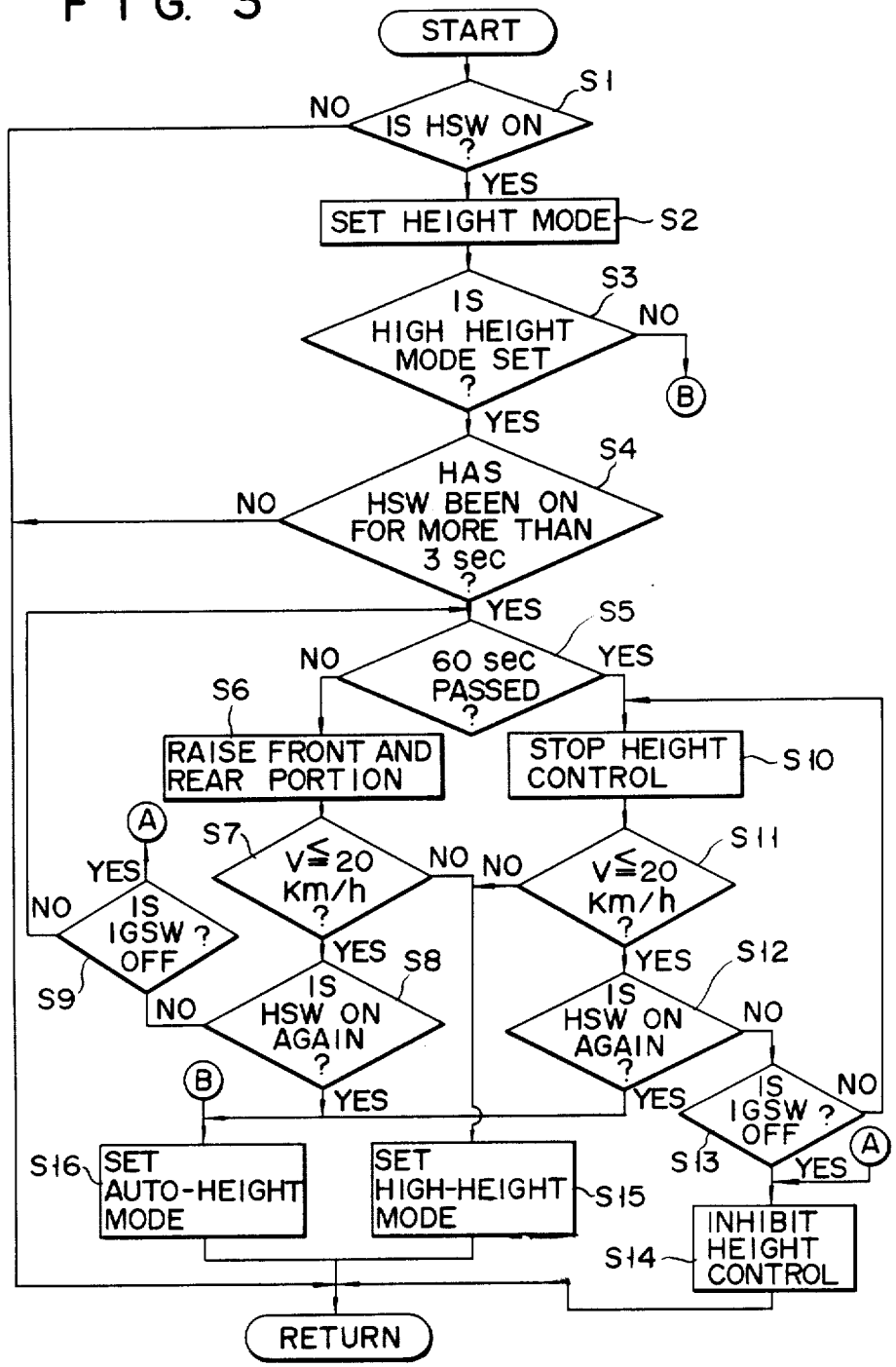
FIG. 3 is a flow chart for explaining the operation of the vehicle suspension apparatus shown in FIGS. 2A and 2B.

Second, as is apparent from step S7 or S11 of the flow chart of FIG. 3, when the velocity exceeds the preset velocity (20 km/h) while the height is being increased to the maximum height or after the height is set to the maximum height, the unit 25 automatically sets the target height in accordance with the high height mode. In other words, the unit 25 sets the target height to the high height and controls the height equal to the high height. This control operation inhibits driving at a velocity exceeding the preset velocity (20 km/h) at the extreme high height, thereby guaranteeing safe driving.

Third, as is apparent from step S9 or S13 of the flow chart of FIG. 3, when the switch 37 is turned off while the detected height is being increased to the maximum height or after the height is equal to the maximum height, the unit 25 automatically inhibits height control. In other words, the height at which the switch 37 is turned off is maintained. Therefore, this mode can be conveniently used to maintain the height at which the switch 37 is turned off, during the jack-up operation for wheel replacement or tire chain attachment/detachment.

Fourth, since the switch 31 also serves as a high height selection switch, the number of switches arranged in the dashboard can be decreased. In addition, as is apparent from step S4 of the flow chart of FIG. 3, when the switch 31 is kept depressed for the predetermined period of time (3 seconds) or more, the unit 25 processes the ON signal of the switch 31 as a signal for starting height control so as to control the height to the maximum height. However, when the switch 31 is kept depressed for less than 3 seconds, the unit 25 processes the ON signal as a signal for selecting the high or auto height mode. Therefore, the passenger can properly operate the switch 31 without an error.

In the above embodiment, the switch 31 also serves as the high height selection switch. However, the high height selection switch may be provided separately from the switch 31.

The above embodiment is exemplified by a vehicle suspension apparatus with a pneumatic height control unit. However, the present invention is not limited to this apparatus, but can be extended to a vehicle suspension apparatus with a hydropneumatic height control unit.

What is claimed is:

1. A vehicle suspension apparatus comprising:
   height control fluid spring chambers arranged between respective wheels and a vehicle body;
   fluid supply means for supplying a fluid from a fluid source to said fluid spring chambers through fluid supply control valve means;
   fluid exhaust means for exhausting the fluid from said fluid spring chambers through fluid exhaust control valve means;
   a height sensor for detecting the height of a vehicle from the ground;
   height control means for comparing the height detected by said height sensor with a target height and controlling said supply or exhaust control valve means so as to make the detected height equal to the target height;
   a high height selection switch;
   extra high height control means for opening said supply control valve means for a predetermined period of time so as to increase the detected height by a predetermined value upon the operation of said high height selection switch; and
   wherein said apparatus further comprises a velocity sensor for detecting a velocity, and said extra high height control means is operated only when a velocity detected by said velocity sensor is lower than a preset velocity.

2. An apparatus according to claim 1, wherein said extra high height control means detects the state of an engine switch of a vehicle engine and inhibits height control when said engine switch is turned off.

3. An apparatus according to claim 1, wherein said apparatus further comprises target height setting means for selectively setting the target height to one of a plurality of heights.

4. An apparatus according to claim 3, wherein said target height setting means sets as the target height at least one of a normal height or a high height higher than the normal height, and said height sensor can detect as the target height a height lower than the normal height, the normal height, the height between the normal height and the high height, the high height, and a height higher than the high height.

5. An apparatus according to claim 3, wherein said target height setting means sets as the target height the normal height, the high height higher than the normal height and a low height lower than the normal height, and said height sensor can detect as the target height a height lower than the normal height, the low height, a height between the low height and the normal height, the normal height, a height between the normal height and the high height, the high height, and a height higher than the high height.

6. An apparatus according to claim 5, wherein said target height setting means sets the target height in accordance with one of a high mode for setting the target height to the high height and an auto mode for setting the target height to one of the low height, the normal height and the high height, and said apparatus further comprises a mode selection switch for selecting one of the high and auto modes in said target height setting means.

7. An apparatus according to claim 6, wherein said mode selection switch also serves as said high height selection switch.

8. An apparatus according to claim 7, wherein said mode selection switch comprises a normal opened switch, and said target height setting means sets the auto mode upon operation of said mode selection switch in the high mode and the high mode upon the operation of said mode selection switch in the auto mode.

9. An apparatus according to claim 8, wherein said extra high height control means supplies a signal to said supply control valve means to increase the height by the predetermined value when said mode selection switch is depressed for longer than a predetermined period of time in the high mode, and said target height setting means processes an ON signal of said mode selection switch as a signal for setting one of the auto and high modes when said mode selection switch is depressed for less than the predetermined period of time in the high mode.

10. An apparatus according to claim 1, wherein said height control means and said special high height control means constitute a control unit with a microcomputer.

11. A vehicle suspension apparatus comprising:
    height control fluid spring chambers arranged between respective wheels and a vehicle body;
    fluid supply means for supplying a fluid from a fluid source to said fluid spring chambers through fluid supply control valve means;
    fluid exhaust means for exhausting the fluid from said fluid spring chambers through fluid exhaust control valve means;
    a height sensor for detecting the height of a vehicle from the ground;
    height control means for comparing the height detected by said height sensor with a target height and controlling said supply or exhaust control valve means so as to make the detected height equal to the target height;
    a high height selection switch; and extra high height control means for opening said supply control valve means for a predetermined period of time so as to increase the detected height by a predetermined value upon the operation of said high height selection switch wherein said extra high height control means detects the state of an engine switch of a vehicle engine and inhibits height control when said engine switch is turned off.

12. A vehicle suspension apparatus comprising:
height control fluid spring chambers arranged between respective wheels and a vehicle body;
fluid supply means for supplying a fluid from a fluid source to said fluid spring chambers through fluid supply control valve means;
fluid exhaust means for exhausting the fluid from said fluid spring chambers through fluid exhaust control valve means;
a height sensor for detecting the height of a vehicle from the ground;
height control means for comparing the height detected by said height sensor with a target height and controlling said supply or exhaust control valve means so as to make the detected height equal to the target height;
a high height selection switch;
extra high height control means for opening said supply control valve means for a predetermined period of time so as to increase the detected height by a predetermined value upon the operaton of said high height selection switch; and
target height setting means for selectively setting the target height to one of a plurality of heights, wherein said target height setting means sets as the target height at least one of a normal height or a high height higher than the normal height, and said height sensor can detect as the target height a height lower than the normal height, the normal height, the high height, and a height higher than the high height.

13. A vehicle suspension apparatus comprising:
height control fluid spring chambers arranged between respective wheels and a vehicle body;
fluid supply means for supplying a fluid from a fluid source to said fluid spring chambers through fluid supply control valve means;
fluid exhaust means for exhausting the fluid from said fluid spring chambers through fluid exhaust control valve means;
a height sensor for detecting the height of a vehicle from the ground;
height ocntrol means for comparing the height detected by said height sensor with a target height and controlling said supply or exhaust control valve means so as to make the detected height equal to the target height;
a high height selection switch;
extra high height control means for opening said supply control valve means for a predetermined period of time so as to increase the detected height by a predetermined value upon the operation of said high height selection switch; and
target height setting means for selectively setting the target height to one of a plurality of heights, wherein said target height setting means sets as the target height the normal height, the high height higher than the normal height and a low height lower than the normal height, and said height sensor can detect as the target height a height lower than the normal height, the low height, a height between the low height and the normal height, the normal height, a height between the normal height and the high height, the height, and a height higher than the high height.

14. An apparatus according to claim 13, wherein said apparatus further comprises a velocity sensor for detecting a velocity, and said target height setting means sets the target height to the high height when the velocity detected by said velocity sensor exceeds a preset velocity during height up control by said special high height control means or at the end of height control thereby.

15. An apparatus according to claim 11, wherein said apparatus further comprises a velocity sensor for detecting a velocity, and said high height control means is operated only when a velocity detected by said velocity sensor is lower than a preset velocity.

16. An apparatua according to claim 12, wherein said apparatus further comprises a velocity sensor for detecting a velocity, and said high height control means is operated only when a velocity detected by said velocity sensor is lower than a preset velocity.

17. An apparatus according to claim 13, wherein said apparatus further comprises a velocity sensor for detecting a velocity, and said high height control means is operated only when a velocity detected by said velocity sensor is lower than a preset velocity.

18. An apparatus according to claim 12, wherein said extra high height control means detects the state of an engine switch of a vehicle engine and inhibits height control when said engine switch is turned off.

19. An apparatus according to claim 13, wherein said extra high height control means detects the state of an engine switch of a vehicle engine and inhibits height control when said engine switch is turned off.

20. An apparatus according to claim 11, wherein said apparatus further comprises target height setting means for selectively setting the target height to one of a plurality of heights.

21. An apparatus according to claim 11, wherein said height control means and said special high height control means constitute a control unit with a microcomputer.

22. An apparatus according to claim 12, wherein said height control means and said special high height control means constitute a control unit with a microcomputer.

23. An apparatus according to claim 13, wherein said height control means and said special high height control means constitute a control unit with a microcomputer.

24. An apparatus according to claim 5, wherein said apparatus further comprises a velocity sensor for detecting a velocity, and said target height setting means sets the target height to the high height when the velocity detected by said velocity sensor exceeds a preset velocity during height up control by said special high height control means or at the end of height control thereby.

* * * * *

UNITED STATES PATENT AND TRADEMARK OFFICE
CERTIFICATE OF CORRECTION

PATENT NO. : 4,696,483
DATED : September 29, 1987
INVENTOR(S) : TAKIZAWA et al

It is certified that error appears in the above-identified patent and that said Letters Patent is hereby corrected as shown below:

Title page, left-hand column, the Assignee identified as "Mitsubishi Jidosha Kogyo K.K." should read -- Mitsubishi Jidosha Kogyo Kabushiki Kaisha --.

Signed and Sealed this

Fifth Day of July, 1988

Attest:

DONALD J. QUIGG

Attesting Officer      Commissioner of Patents and Trademarks